L. T. VELEN.
POWER MECHANISM FOR HARVESTERS AND THE LIKE.
APPLICATION FILED AUG. 19, 1908.
1,088,384.
Patented Feb. 24, 1914.
2 SHEETS—SHEET 1.
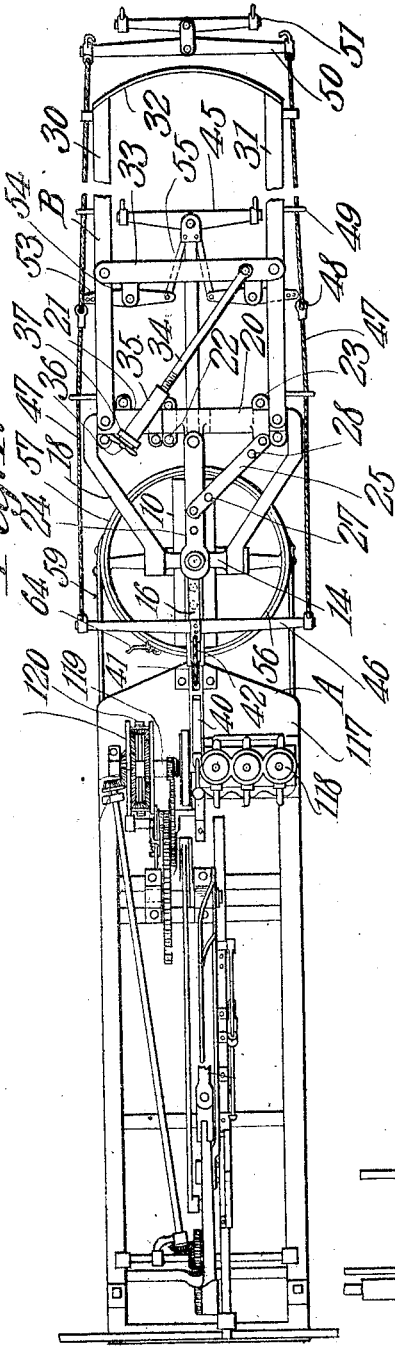
Witnesses
Inventor
Luther T. Velen.
By C. A. Snow & Co.
Attorneys

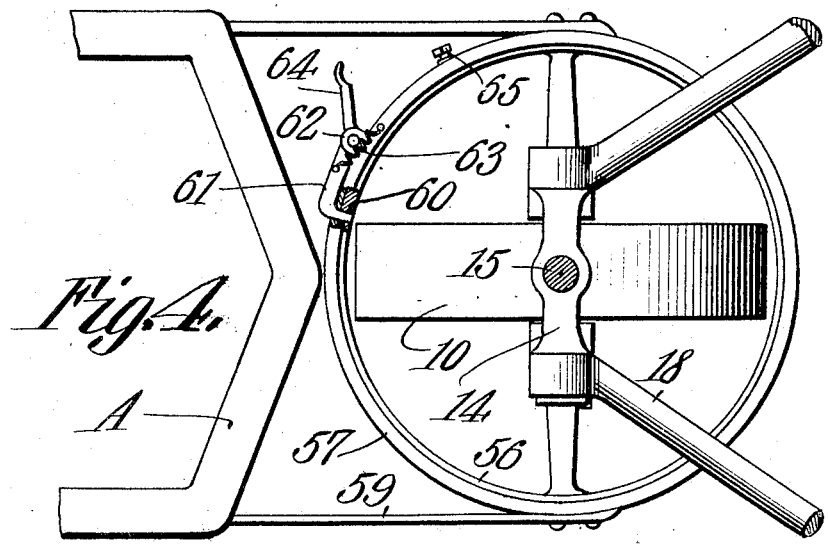
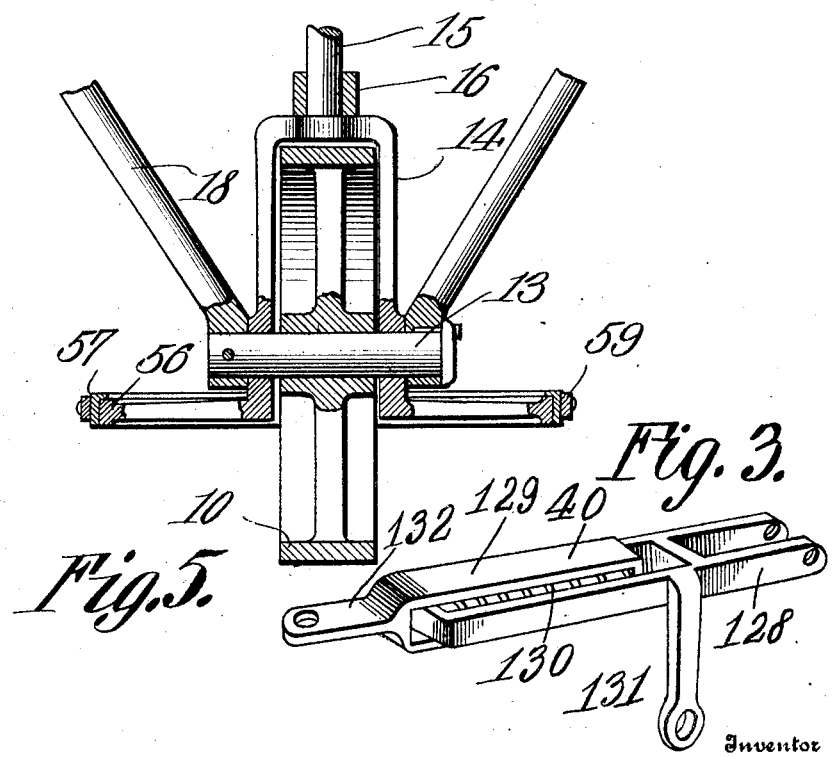

UNITED STATES PATENT OFFICE.

LUTHER THEODORE VELEN, OF CLEBURNE, KANSAS.

POWER MECHANISM FOR HARVESTERS AND THE LIKE.

1,088,384.  Specification of Letters Patent.  Patented Feb. 24, 1914.

Original application filed November 4, 1907, Serial No. 400,553. Divided and this application filed August 19, 1908. Serial No. 449,330.

*To all whom it may concern:*

Be it known that I, LUTHER T. VELEN, a citizen of the United States, residing at Cleburne, in the county of Riley and State of Kansas, have invented a new and useful Power Mechanism for Harvesters and the like, of which the following is a specification.

This invention has relation to power mechanisms for harvesters, etc., and it consists in the novel construction and arrangement of its parts as hereinafter shown and described.

The subject matter of the present invention is divided from my application for patent for harvester, filed in the United States Patent Office, on November 4, 1907, Serial No. 400,553.

The object of the invention is to provide for the employment of a mechanical motor and draft animal means for propelling and operating a harvester or similar machine, and to employ means whereby the strain may be automatically distributed, so that when ascending a grade the full power of the motor may be used to assist the animal, while in descending a grade the motor may be cut off either partially or entirely.

A still further object of the invention is to provide an engine governor that is under the control of the draft animal.

A still further object of the invention is to provide a gas engine in which the power exerted is in proportion to that exerted by the draft animal.

In the accompanying drawings:—Figure 1 is a plan view of the mechanism. Fig. 2 is a side elevation of the same. Fig. 3 is a perspective view of a spring actuated draft equalizing mechanism used in the device. Fig. 4 is a sectional plan view through the connecting bolt which connects the two main frames of the mechanism, and Fig. 5 is a vertical section on the plane of the axis of the front or steering wheel.

Similar numerals of reference are employed to indicate corresponding parts throughout the several figures of the drawings.

The machine as a whole is propelled and actuated by draft animals with the assistance of an internal combustion engine or similar motor mechanism, and the draft appliance and steering mechanisms are arranged on a separate frame in advance of the main frame which carries the actuated parts of the machine.

The actuated mechanisms (not shown in full) are carried by a frame A, and the draft mechanism is supported by a frame B, while the structure as a whole is supported by the front wheel 10 and the rear driving wheels 11.

The wheel 10 is the steering wheel and is carried by a stationary shaft or axle 13, that is mounted on a U-shaped frame 14, straddling the upper portion of the steering wheel, and from the top of this frame projects a king bolt 15 to which is pivoted an arched bar 16 that constitutes the forward member of the main frame A.

Secured to the opposite ends of the shaft or axle 13 is a yoke shaped bar 18, the sides of which gradually diverge upward and forward from the axle, and the transversely extending portion of this bar is circular in cross section and supports two sleeves 20 and 21, each sleeve being provided with projecting ears 22 that are connected by suitable bolts to half-straps 23 that encircle the lower portion of the bar, so that the two sleeves may rock freely on the bar, and each sleeve is free for movement independent of the other. To the rear portion of the sleeve 20 is pivoted the forward end of a link 24, the rear end of which is pivotally connected to the upper end of the king bolt 15. This link is reinforced by a diagonally extending brace 25 that is secured at one end to the link at a point about midway of the ends of the latter, and at its opposite end is pivotally connected to one of the ears 22. The brace 25 is provided with auxiliary openings 27 and 28 which are to be used when the brace is detached from the pivot ear 22, as will hereinafter appear, the brace being so arranged that it may be swung around to parallel relation with the link, after which a securing bolt is passed through the opening 27 and an alining opening in the link 24 in order to rigidly lock the link and brace to each other.

To the outer ends of the sleeves 20 and 21 are pivoted the ends of a pair of parallel frame bars 30 and 31, the forward ends of which are connected by a curved strap 32 that preferably is of such construction as to permit slight yielding movement of the side bars with relation to each other. These bars 30 and 31 are further connected by a cross bar 33, which is pivoted to the bars 30 and 31. This forms an approximately rectangular frame which may be adjusted to correct irregularities of draft or side strain by means of a diagonal brace 34. The forward end of the brace 34 is pivotally connected to the cross bar 33, and the rear end of the rod is threaded and fits within an elongated nut 35 having at its rear end an operating handle 36. This nut is revolubly mounted in a bracket 37 that is carried by the sleeve 21. It will be noted that the brace extends diagonally across the frame, that is composed essentially of four pivotally connected members, and by turning the nut in one direction or the other, the ends of the brace may be adjusted in order to insure the adjusting of the frame members to positions at a right angle to each other.
Where draft animals are employed, as in the present instance, the draft strain is transmitted to the draft rigging 40 on the frame A, the construction of which will be hereinafter described, and at the forward end of this draft rigging is a sheave 41 over which passes a cable or chain 42. The lower run of the cable 42 is connected to the rear end of a draft bar 43 that passes through a guide 44 attached to the under side of the cross bar 33. At the forward end of the draft bar is secured a swingletree 45 to which a draft animal may be attached, the animal being placed in the space between the swingletree 45, the front bar 32, and the two side bars 30 and 31.

The upper run of the cable 42 is connected to the central portion of a cross bar or tree 46 from the opposite ends of which extend two cables or chains 47, each composed of two sections, that are connected to each other by a hook and eye 48. The forward ends of these cables are passed through guiding openings formed in brackets 49 projecting from the sides of the bars 30 and 31, and at their forward terminals are secured to a cross bar 50, to the central portion of which is connected a swingletree 51, and to which the forward draft animal may be hitched. It will be seen that the tractive force exerted by the two draft animals is transmitted to the upper and lower runs of the cable, and from thence to the sheave 41 and draft gearing 40 and the strain exerted by one animal is directly opposed to that exerted by the other, thus forming an equalizing means.

In some cases, especially where the internal combustion engine or other mechanical motor is employed for the traction power, it may be desired to equalize the draft more directly between the draft animals, and in this case the hooks and eyes 48 are connected to the outer ends of levers 53 which are pivoted to brackets 54 projecting from the cross bar 33, and the inner ends of these levers are connected by links 55 to the clevis or similar connection between the swingletree 45 and the draft bar 43.

It is to be noted in passing that in the structure just described an arched triangular truss is formed by the yoke shaped bar 18, the link 24 and king bolt 15 and frame 14, but if the link 24 is disconnected from the king pin and the diagonal brace 25 is swung around into alinement with the link, a loose frame structure is formed and the yoke shaped frame 18 is then free to swing with the axle 13 as a fulcrum so that the draft frame may swing upward and rearward for the purpose of transmitting movement to portions of the mechanism carried by the frame A.

The lower ends of the U-shaped frame 14 are turned outward forming a spider that carries a ring 56, and this fits within a second ring 57 that is in the form of an angle bar in cross section, in order that it may rest and turn on the ring 56. Secured to the outer sides of the ring 57 at diametrically opposite points are bars 59, the rear ends of which are permanently secured to the forward portion of the main frame A. This mechanism constitutes a turn table or steering connection between the two frames, so that the draft frame as a whole may be turned at any angle to the main frame in steering between crooked rows, or in turning the machine after the end of a row is reached. Where the rows are perfectly straight, it is sometimes desirable to lock the turn table and prevent independent rotative movement of the rings, and for this purpose the two rings are provided with openings 60 which may be brought into alinement with each other, and which are arranged to receive a locking pawl 61 that is pivoted on a bracket 62 projecting from the outer face of the ring 57. This pawl is held in locking position by a helical tension spring 63 and the tail 64 of the pawl forms a handle by which it may be moved out of locking engagement with the rings. When moved to release position, the spring 63 crosses the center of the pawl pivot, so that the pawl is held in unlocked position and the rings will be free for independent rotative movement. As an additional locking means a set screw 65 is tapped through bosses in the upper ring 57, and is arranged to bear against the periphery of the inner ring 56.

The main frame A is oblong in plan and is formed preferably of channel bars or I-beams, welded or otherwise permanently secured to form a rigid structure. The forward bar of the frame tapers slightly toward the center and is permanently secured by bolts or similar fastenings to the lower rear end of the arched bar 16. Near the rear end of the frame, each of the side bars is provided with an approximately semi-circular arch 70 and to the inner faces of these are secured bearing blocks 71, in which is journaled the rear axle 72 of the machine, this rear axle being provided at its ends with spindles, on which the rear wheels 11 are mounted.

On the forward portion of the main frame A is a platform 117 on which is mounted a motor or prime mover 118, the driving or actuating shaft 119 of which is connected to a differential or compensating device denoted generally by the numeral 120, the said differential or compensating device being connected to the respective driving wheels 11 in any desirable manner. The differential or compensating device is provided in order to permit the power to be transmitted proportionately to the two driving wheels, and in order to permit one or the other of the wheels to rotate faster than the other.

Where both the draft animals or other traction means and the internal combustion engine are employed for the purpose of propelling the machine, it becomes necessary to control the operation of the engine and govern its power in accordance with the strain exerted by the draft animals. For this purpose a governing device of any suitable type is applied to the engine, and, in the present instance, is indicated by a valve 126, but it is to be understood that this illustration is merely typical, inasmuch as any governing means of ordinary type may be used, such, for instance, as a controlling valve applied to the carbureter or to the inlet port of the engine, or a device for controlling the exhaust by holding the exhaust valve open at times, or by the employment of any ordinary centrifugal governor, and a means for adjusting the sensitiveness of the governor. In any case a governing means is connected by a link 127 to the draft gear 40.

The draft gear 40 in the present instance comprises a pair of U-shaped bars 128 and 129 disposed opposite to each other and carrying between them a helical compression spring 130. The forward bar 128 has a bracket 131 for connection with the link 127, and is further provided with carrying bracket for the cable guiding sheave 41. The rear bar 129 has an arm 132 that is pivoted to a pin 133 carried by a truss frame 134 that is rigidly secured to the forward portion of the main frame.

When the machine is ascending a grade, the strain on the draft animals is necessarily more severe than when traveling on a level surface or descending a grade. The spring 130 of the draft gear will then be compressed to an extent depending on the draft and the movement will be transmitted through the link 127 to the engine governor. The governor will then operate to allow the engine to run with increased speed or increased power, as by permitting the flow of a larger quantity of fuel to the engine, so that when strain on the draft animal is severe, the horse power of the engine is increased, and when the strain on the draft animal decreases, the power of the engine is proportionately lessened. It is, of course, to be understood in this connection that a traction engine or other device may be employed in place of the draft animal and will operate with the same efficiency in the control of the internal combustion engine.

What I claim is:—

1. In combination, a frame having propelling wheels, a motor carried by the same and connected to the propelling wheels, and a draft means for the frame and connected with the motor to increase or decrease the power transmitted to the propelling wheels upon the tension of the draft means being increased or decreased.

2. In combination, a frame having propelling wheels, an engine carried by the frame and connected to said propelling wheels, a draft means for the frame, and an engine governor controlled by the draft means to increase or decrease the power transmitted to the propelling wheels upon the tension of the draft means being increased or decreased.

3. In combination, a frame having propelling wheels, an engine connected to the propelling wheels, a draft means for the frame, and automatic equalizing means connecting the engine and draft means to increase or decrease the power transmitted to the propelling wheels upon the tension of the draft means being increased or decreased.

4. In combination, a frame having propelling wheels, an engine mounted upon the frame and connected to the propelling wheels, a draft means for the frame, and throttle governing means for the engine operatively connected with the draft means to increase or decrease the power transmitted to the propelling wheels upon the tension of the draft means being increased or decreased.

5. In combination, a frame having propelling wheels, an engine connected to the propelling wheels, a draft means for the frame, a compensating connection between the draft means and the engine, and an engine governor under the control of the draft means to increase or decrease the power transmitted to the propelling wheels upon the tension of the draft means being increased or decreased.

6. In combination, a frame having propelling wheels, an engine carried by the frame and connected to said propelling wheels, a draft means for the frame and automatic power governing means for the engine operatively connected with the draft means and a compensating connection between the draft means and the automatic governing means, whereby the power transmitted to the propelling wheels is increased or decreased upon the tension of the draft means being increased or decreased.

7. In combination, a frame having propelling wheels, an engine carried by the frame and connected to said propelling wheels, a draft means for the frame, a yieldable draft gear connecting the draft means to the frame, an engine governor, and a governor controlling device connected to the draft gear to increase or decrease the power transmitted to the propelling wheels upon the tension of the draft means being increased or decreased.

8. In combination, a frame having propelling wheels, an engine mounted on the frame and connected to said propelling wheels, a draft means for the frame, a spring draft gear connecting the draft means to the frame, a governor for the engine, and a governor controlling device connected to the draft gear to increase or decrease the power transmitted to the propelling wheels upon the tension of the draft means being increased or decreased.

9. In mechanism of the class described, a pair of swingletrees arranged one in advance of the other, a draft rigging, a sheave carried thereby, and flexible connections extending around the sheave to the swingletrees to thereby equalize the strain on the draft animals, and an engine governed by the strain upon the draft rigging.

10. In a device as described, a longitudinally movable beam, a draft member connected with said beam, a second draft member located in advance of the first said draft member, means connecting said draft members together whereby the forward movement of one draft member will produce a rearward movement of the other member, and an engine governed by the draft means and means for operatively connecting the engine with the beam.

11. In a device as described, a frame, a steering mechanism, a steering frame connected with said steering mechanism, means for adjusting the angle of said steering frame when the steering mechanism is in operation, a draft means for the frame, and an engine mounted on the said frame and governed by the draft means to increase or decrease the power transmitted by the said engine upon the tension of the draft means being increased or decreased.

12. In a device as described, a cross bar, a pair of levers pivoted to said cross bar, a draft member connected with the inner ends of said levers, a cross piece located in advance of said cross bar, connections between the outer ends of said levers and the ends of said cross piece, an engine, and means connecting the levers with the engine to govern the same.

13. In a vehicle provided with horse attaching means, a motor, means for driving said vehicle from said motor, and means coacting with said horse attaching means adapted to vary the power supplied by said motor in proportion to the pull upon the horse attaching means, substantially as described.

In testimony that I claim the foregoing as my own, I have hereto affixed my signature in the presence of two witnesses.

LUTHER THEODORE VELEN.

Witnesses:
C. A. G. SUNDSTROM,
ADOFF BERGHEIMER.